April 21, 1953     W. E. SEYMOUR     2,635,336
GARDEN CUTTING TOOL
Filed Sept. 9, 1950
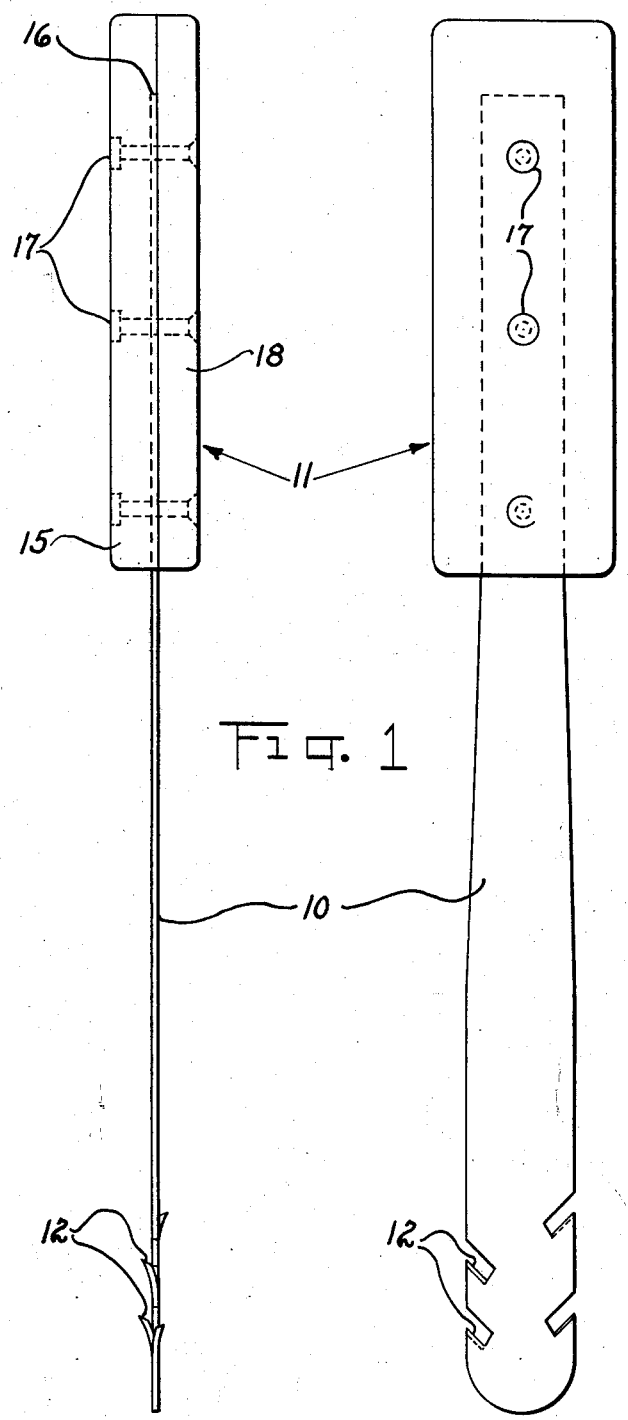
INVENTOR
Wilfred E. Seymour.
BY
William Frederick Werner.
ATTORNEY Patented Apr. 21, 1953

2,635,336

UNITED STATES PATENT OFFICE 2,635,336

GARDEN CUTTING TOOL

Wilfred E. Seymour, Saunderstown, R. I., assignor of one-half to Albert O. Coates, Providence, R. I.

Application September 9, 1950, Serial No. 183,987

1 Claim. (Cl. 30—317)

This invention relates to cutting tools and more particularly to a blade for cleaning grass from lawn mower axles and for cutting weeds, flowers and dead branches from bushes.

One of the principal objects of this invention is to provide a serviceable, inexpensive tool adapted for insertion in the windings found around that portion of a lawn mower shaft located between the rotating grass cutting blade and the carrying wheel and for removing the same.

Another object of the present invention is to provide a blade with a cutting edge to enable dead branches and cane to be removed from thorny bushes while protecting the user from skin scratches and clothing tears.

Still another object of the present invention is to provide a general utility garden tool which can be used to cut, remove and extend the reach of the user when puttering around in the garden, lawn, flower beds, berry bushes or vegetable patch.

Other objects of the present invention will become apparent in part and be pointed out in part in the following specification and claim.

In the accompanying drawings wherein like reference characters refer to like parts:

Figure 1 is a side elevational view of the general utility cutting tool.

Figure 2 is a front elevational view of the same.

Referring to both figures of the drawing the general utility garden cutting tool comprises as its basic elements, a blade 10 and a handle 11.

The blade 10 is provided with hooked cutting members 12 generally U shaped, said blade being shown as consisting of four such members but the number of members may be increased or decreased and the shape of the cutting members may be changed without departing from the spirit or scope of this invention.

The handle 10 in a preferred embodiment consists of two halves secured together in any well known manner but shown as riveted by way of example. One half 15 is recessed at 16 to accommodate blade 10. Rivets 17 secure blade 10 to handle halves 15 and 18.

In using the described general utility garden tool the end of blade 10 provided with the hooked cutting members 12 is inserted into the windings of the lawn mower (not shown) side ways as shown in Figure 1. The hooked cutting members 12 are wedged or forced into the windings. The handle 11 is jerked and pulled, thus cutting and tearing the windings loose. Experience has taught that these windings can be hard and difficult to remove. The U shape of the hooked cutting members 12 will assist in removing the windings from the shaft when the handle 11 is withdrawn from between the rotating grass cutter blade and the carrying wheel.

In another use of the general utility garden tool the hooked cutting members 12 form in effect a briar or bough hook which is designed for cutting small branches in thorny bushes and hedges. The U shaped members 12 will enable the user to reach into a bush and drag out dead branches and debris.

In still another use of the general utility garden tool the hooked cutting members 12 generally U shaped at the end of a long blade 10, may be used to embrace a weed in a flower bed by reaching into the flower bed and either yanking the weed out by the root if it wedges itself in a member 12 or cutting the weed off if it is small and soft. In either case the weed is unable to choke out the flowers.

What I claim is:

A general utility garden cutting tool comprising a handle and an elongated, flexible blade, said blade being of thin, flat section and having a rounded end opposite the handle, and adjacent said rounded end and at both edges of the blade, having a plurality of slots inclined toward the end of the blade the lower edges of said slots being sharpened to provide cutting edges, alternate cutting edges of the slots being bent outwardly in opposite directions to form cutting elements on opposite sides of the blade.

WILFRED E. SEYMOUR.

References Cited in the file of this patent

UNITED STATES PATENTS

| Number | Name | Date |
|---|---|---|
| 853,367 | Malory | May 14, 1907 |
| 912,146 | Moffett | Feb. 9, 1909 |
| 1,065,456 | Lowrey | June 24, 1913 |
| 1,355,828 | Fleming | Oct. 19, 1920 |